United States Patent
Watanabe et al.

(10) Patent No.: US 12,467,894 B2
(45) Date of Patent: Nov. 11, 2025

(54) GAS SENSOR

(71) Applicant: NGK INSULATORS, LTD., Aichi (JP)

(72) Inventors: Yusuke Watanabe, Nagoya (JP);
Shotaro Niizuma, Kasugai (JP);
Toshihiro Hirakawa, Kasugai (JP);
Hayami Aota, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 263 days.

(21) Appl. No.: 18/138,170

(22) Filed: Apr. 24, 2023

(65) Prior Publication Data

US 2023/0304963 A1  Sep. 28, 2023

Related U.S. Application Data

(62) Division of application No. 17/497,012, filed on Oct. 8, 2021, now abandoned.

(30) Foreign Application Priority Data

Oct. 12, 2020 (JP) .................................. 2020-171667

(51) Int. Cl.
*G01N 27/407* (2006.01)
*G01N 27/409* (2006.01)
(Continued)

(52) U.S. Cl.
CPC ..... *G01N 27/4073* (2013.01); *G01N 27/4071* (2013.01); *G01N 27/409* (2013.01); *G01N 27/41* (2013.01); *G01N 33/0037* (2013.01)

(58) Field of Classification Search
CPC ........... G01N 27/4073; G01N 27/4071; G01N 27/409; G01N 27/41; G01N 27/4077; G01N 33/0037; Y02A 50/20
See application file for complete search history.

(56) References Cited

U.S. PATENT DOCUMENTS

2004/0217000 A1* 11/2004 Yamamoto ......... G01N 27/4071
204/426
2012/0217160 A1 8/2012 Hayashi et al.
(Continued)

FOREIGN PATENT DOCUMENTS

JP 2004-151018 A 5/2004
JP 2006-170888 A 6/2006
(Continued)

OTHER PUBLICATIONS

Nolte et al., English translation of WO2016102213A1, 2016 (Year: 2016).*

(Continued)

*Primary Examiner* — Luan V Van
*Assistant Examiner* — Shizhi Qian
(74) *Attorney, Agent, or Firm* — MATTINGLY & MALUR, PC

(57) ABSTRACT

A gas sensor includes: a laminate formed of a plurality of layers including at least one layer of a solid electrolyte; a reference gas chamber formed in the laminate and containing a reference gas; and a reference electrode partially exposed in the reference gas chamber. A portion which is not exposed in the reference gas chamber, of the reference electrode is sandwiched between, among the layers, a first layer and a second layer adjacent to the first layer. When an area of the portion sandwiched between the first layer and the second layer, of the reference electrode is defined as a first area, and an area of a portion exposed in the reference gas chamber, of the reference electrode is defined as a second area, a ratio of the first area to the second area is 0.3 or more.

6 Claims, 10 Drawing Sheets

(51) Int. Cl.
*G01N 27/41* (2006.01)
*G01N 33/00* (2006.01)

(56) References Cited

U.S. PATENT DOCUMENTS

| | | | |
|---|---|---|---|
| 2016/0082390 A1* | 3/2016 | Nakano | G01N 27/4074 |
| | | | 700/271 |
| 2018/0284056 A1 | 10/2018 | Watanabe | |
| 2019/0145925 A1 | 5/2019 | Fujii et al. | |
| 2019/0285575 A1* | 9/2019 | Watanabe | G01N 27/301 |
| 2019/0302050 A1 | 10/2019 | Furuta et al. | |

FOREIGN PATENT DOCUMENTS

| | | |
|---|---|---|
| JP | 5204638 B2 | 6/2013 |
| JP | 2017-207466 A | 11/2017 |
| JP | 2018-169328 A | 11/2018 |
| JP | 2019-158866 A | 9/2019 |
| JP | 6697232 B2 | 5/2020 |
| WO | WO-2001050118 A1 * | 7/2001 |
| WO | WO-2016102213 A1 * | 6/2016 |
| WO | 2018/230703 A1 | 12/2018 |

OTHER PUBLICATIONS

Japanese Office Action received in corresponding Japanese Application No. 2020-171667 dated Mar. 5, 2024.
Unexamined U.S. Appl. No. 17/497,014, filed Oct. 8, 2021.
Unexamined U.S. Appl. No. 17/497,016, filed Oct. 8, 2021.

* cited by examiner

FIG. 7

[TABLE 1]

| | AREA RATIO (S1/S2) | LAYOUT OF SANDWICHED PORTION | RECESS | PROTRUDING PORTION | RESULT OF PEELING TEST |
|---|---|---|---|---|---|
| EXAMPLE 1 | 0.3 | A | NOT PRESENT | NOT PRESENT | C |
| EXAMPLE 2 | 0.3 | A | NOT PRESENT | PRESENT | B |
| EXAMPLE 3 | 0.3 | A | PRESENT | NOT PRESENT | A |
| EXAMPLE 4 | 0.3 | B | NOT PRESENT | PRESENT | B |
| EXAMPLE 5 | 0.3 | B | PRESENT | NOT PRESENT | A |
| EXAMPLE 6 | 0.3 | D | NOT PRESENT | NOT PRESENT | A |
| EXAMPLE 7 | 0.5 | B | NOT PRESENT | NOT PRESENT | B |
| EXAMPLE 8 | 0.8 | B | NOT PRESENT | NOT PRESENT | A |
| EXAMPLE 9 | 0.8 | C | PRESENT | NOT PRESENT | A |
| EXAMPLE 10 | 1.0 | C | NOT PRESENT | PRESENT | A |
| EXAMPLE 11 | 1.2 | D | NOT PRESENT | NOT PRESENT | A |
| EXAMPLE 12 | 1.5 | D | NOT PRESENT | NOT PRESENT | A |
| COMPARATIVE EXAMPLE 1 | 0 | E | NOT PRESENT | NOT PRESENT | D |
| COMPARATIVE EXAMPLE 2 | 0 | E | PRESENT | PRESENT | D |
| COMPARATIVE EXAMPLE 3 | 0.25 | A | NOT PRESENT | NOT PRESENT | D |
| COMPARATIVE EXAMPLE 4 | 0.25 | A | NOT PRESENT | PRESENT | D |
| COMPARATIVE EXAMPLE 5 | 0.25 | A | PRESENT | PRESENT | D |
| COMPARATIVE EXAMPLE 6 | 0.25 | B | NOT PRESENT | NOT PRESENT | D |
| COMPARATIVE EXAMPLE 7 | 0.25 | D | NOT PRESENT | NOT PRESENT | D |

GAS SENSOR

CROSS-REFERENCE TO RELATED APPLICATION

This application is based upon and claims the benefit of priority from Japanese Patent Application No. 2020-171667 filed on Oct. 12, 2020, the contents of which are incorporated herein by reference.

BACKGROUND OF THE INVENTION

Field of the Invention

The present invention relates to a gas sensor.

Description of the Related Art

JP 2004-151018 A discloses a laminated gas sensor element capable of measuring the concentration of nitrogen oxide (NOx) or the like in a gas to be measured. The laminated gas sensor element disclosed in JP 2004-151018 A includes a measured gas chamber, an oxygen pump cell, and a sensor cell. The measured gas is introduced into the measured gas chamber. The oxygen pump cell has a pump electrode provided so as to face the measured gas chamber. The sensor cell detects the concentration of a specific gas in the measured gas chamber. Further, the laminated gas sensor element disclosed in JP 2004-151018 A includes a reference gas chamber in which an electrode (reference electrode) is formed.

SUMMARY OF THE INVENTION

However, in the conventional gas sensor, the reference electrode may be peeled off. If the reference electrode is peeled off, detection accuracy is lowered, and further, detection may become impossible.

An object of the present invention is to provide a gas sensor capable of suppressing peeling of a reference electrode.

According to an aspect of the present invention, provided is a gas sensor comprising: a laminate comprising a plurality of layers including at least one layer made of a solid electrolyte; a reference gas chamber which is formed in the laminate and in which a reference gas exists; and a reference electrode partially exposed in the reference gas chamber, wherein a portion which is not exposed in the reference gas chamber, of the reference electrode is sandwiched between, among the plurality of layers, a first layer and a second layer that is adjacent to the first layer, and when an area of the portion which is sandwiched between the first layer and the second layer, of the reference electrode is defined as a first area, and an area of a portion which is exposed in the reference gas chamber, of the reference electrode is defined as a second area, a ratio of the first area to the second area is 0.3 or more.

According to the present invention, it is possible to provide a gas sensor capable of suppressing peeling of a reference electrode.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a diagram showing Table 1 illustrating test results;

DESCRIPTION OF THE PREFERRED EMBODIMENTS

The gas sensor according to the present invention will be described below in detail in connection with a preferred embodiment while referring to the accompanying drawings.

EMBODIMENT

Figure 1:
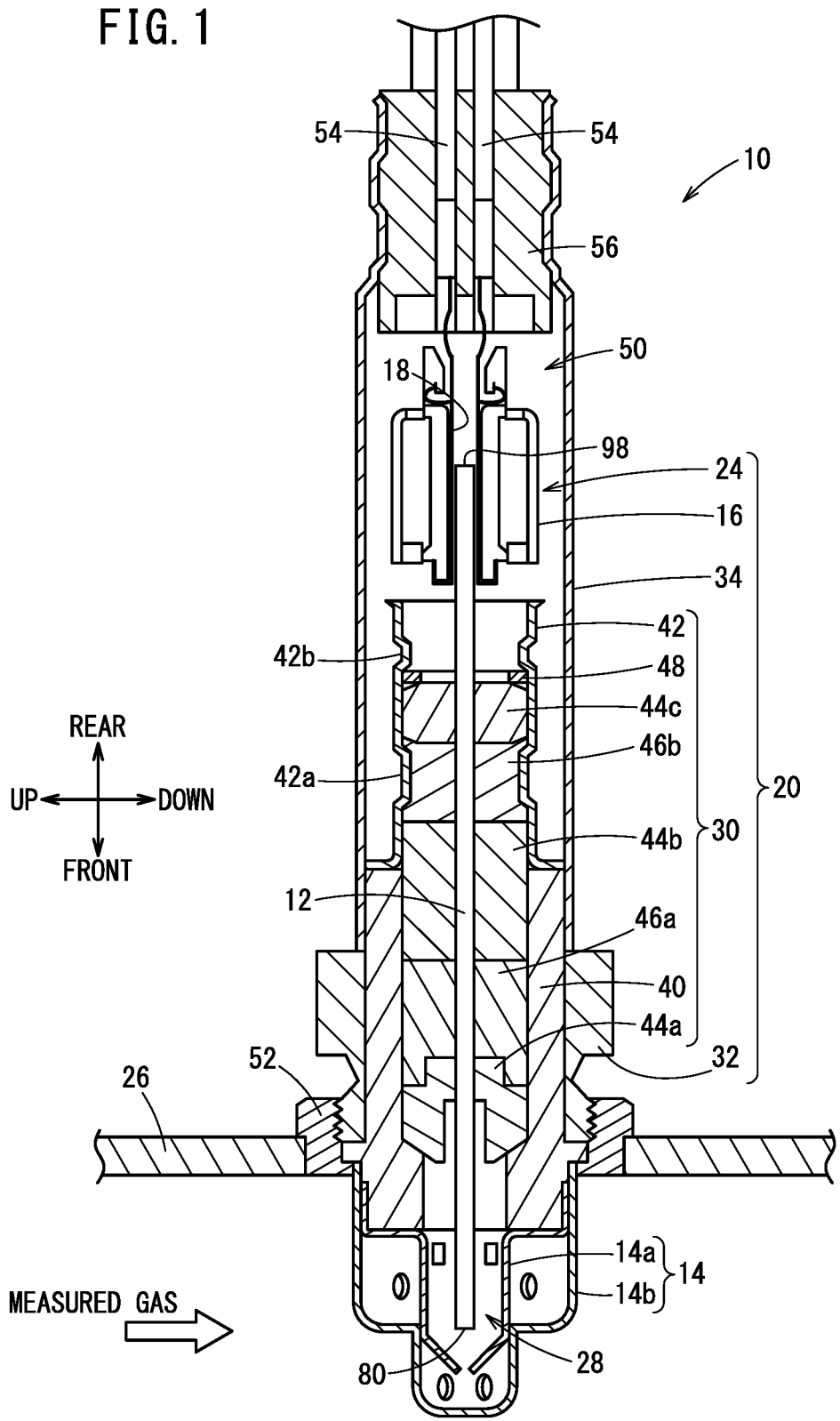
FIG. 1 is a cross-sectional view showing an example of a gas sensor according to an embodiment.
Figure 2:
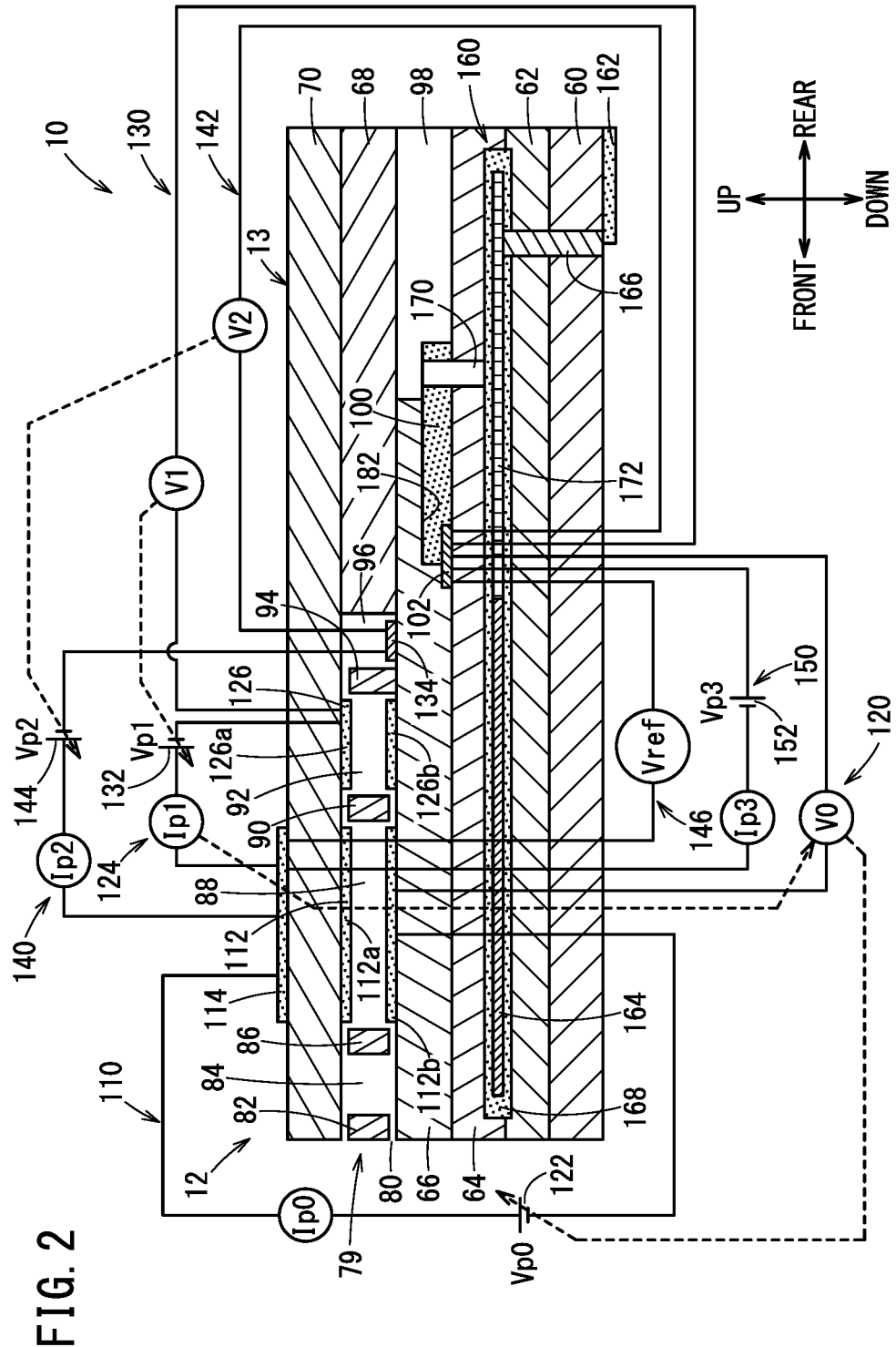
FIG. 2 is a cross-sectional view showing a part of the gas sensor according to the embodiment.

A gas sensor according to an embodiment will be described with reference to FIGS. 1 to 10C. FIG. 1 is a cross-sectional view showing an example of a gas sensor according to the present embodiment. FIG. 2 is a cross-sectional view showing a part of the gas sensor according to the present embodiment.

As shown in FIG. 1, a gas sensor 10 includes a sensor element 12. The sensor element 12 has, for example, an elongated rectangular parallelepiped shape. The longitudinal direction of the sensor element 12 is defined as a front-rear direction. That is, the left-right direction in FIG. 2 is defined as the front-rear direction. The thickness direction of the sensor element 12 is defined as an up-down direction. That is, the up-down direction in FIG. 2 is defined as the up-down direction. The width direction of the sensor element 12 is defined as the left-right direction. That is, a direction perpendicular to the front-rear direction and the up-down direction is defined as the left-right direction.

The gas sensor 10 further includes a protective cover 14. The protective cover 14 protects the front end side which is one side in the longitudinal direction of the sensor element 12. The gas sensor 10 further includes a sensor assembly 20 including a ceramic housing 16. Metal terminals 18 are attached to the ceramic housing 16. The metal terminals 18 hold the rear end portion of the sensor element 12 and are electrically connected to the sensor element 12. The metal terminals 18 are attached to the ceramic housing 16 to form a connector 24.

The gas sensor 10 may be attached to a pipe 26, for example. Examples of the pipe 26 include an exhaust gas pipe of a vehicle. The gas sensor 10 can be used to measure the concentration of a specific gas contained in an exhaust gas or the like, which is a measured gas. Examples of the specific gas include, but are not limited to, nitrogen oxides, oxygen ($O_2$), and the like.

The protective cover 14 includes an inner protective cover 14a and an outer protective cover 14b. The inner protective cover 14a is a bottomed tubular protective cover that covers the front end of the sensor element 12. The outer protective cover 14b is a bottomed tubular protective cover that covers the inner protective cover 14a. The inner protective cover 14a and the outer protective cover 14b have formed therein a plurality of holes that allow the measured gas to flow in the interior of the protective cover 14. The front end of the sensor element 12 is located in a space surrounded by the inner protective cover 14a. That is, the front end of the sensor element 12 is located in a sensor element chamber 28.

The sensor assembly 20 includes an element sealing body 30 for sealing and fixing the sensor element 12. The sensor assembly 20 further includes a nut 32 attached to the element sealing body 30. The sensor assembly 20 further includes an outer tube 34 and the connector 24. The metal terminals 18 provided in the connector 24 are connected to electrodes (not shown) formed on the surfaces of the rear end of the sensor element 12. That is, the metal terminals 18 provided in the connector 24 are connected to the electrodes (not shown) formed on the upper surface and the lower surface of the rear end of the sensor element 12.

The element sealing body 30 includes a tubular main fitting 40 and a tubular inner tube 42. The central axis of the main fitting 40 and the central axis of the inner tube 42 coincide with each other. The main fitting 40 and the inner tube 42 are fixed by welding. Ceramic supporters 44a to 44c, green compacts 46a and 46b, and a metal ring 48 are sealed in a through hole inside the main fitting 40 and the inner tube 42. The sensor element 12 is located on the central axis of the element sealing body 30. The sensor element 12 penetrates the element sealing body 30 in the front-rear direction. The inner tube 42 has reduced-diameter portions 42a and 42b. The reduced-diameter portion 42a presses the green compact 46b in a direction toward the central axial of the inner tube 42. The reduced-diameter portion 42b presses forward the ceramic supporters 44a to 44c and the green compacts 46a and 46b via the metal ring 48. The green compacts 46a and 46b are compressed between the main fitting 40 and the sensor element 12 and between the inner tube 42 and the sensor element 12 by the pressing forces from the reduced-diameter portions 42a and 42b. Thus, the green compacts 46a and 46b provide a seal between the sensor element chamber 28 in the protective cover 14 and a space 50 in the outer tube 34, and fix the sensor element 12.

The nut 32 is fixed to the main fitting 40. The central axis of the nut 32 and the central axis of the main fitting 40 coincide with each other. A male screw portion is formed on an outer peripheral surface of the nut 32. A female screw portion is formed on an inner peripheral surface of a fixing member 52 welded to the pipe 26. The male screw portion formed on the outer peripheral surface of the nut 32 is inserted into the fixing member 52 having the female screw portion formed on the inner peripheral surface thereof. Thus, the gas sensor 10 is fixed to the pipe 26 in a state where the front end of the sensor element 12 protected by the protective cover 14 protrudes into the pipe 26.

The outer tube 34 encloses the inner tube 42, the sensor element 12, and the connector 24. A plurality of lead wires 54 connected to the connector 24 are drawn out from the rear end of the outer tube 34 to the outside. The lead wires 54 electrically conduct to electrodes of the sensor element 12 via the connector 24. The gap between the outer tube 34 and the lead wires 54 is sealed by an elastic insulating member 56 formed of a grommet or the like. The space 50 in the outer tube 34 is filled with a reference gas (atmosphere). The rear end of the sensor element 12 is located in the space 50.

As shown in FIG. 2, the sensor element 12 includes a laminate 13 formed of a first substrate layer 60, a second substrate layer 62, a solid electrolyte layer 64, a solid electrolyte layer 66, a spacer layer 68, and a solid electrolyte layer 70. The second substrate layer 62 is laminated on the first substrate layer 60. The solid electrolyte layer 64 is laminated on the second substrate layer 62. The solid electrolyte layer 66 is laminated on the solid electrolyte layer 64. The spacer layer 68 is laminated on the solid electrolyte layer 66. The solid electrolyte layer 70 is laminated on the spacer layer 68. For example, a solid electrolyte is used as the material of these layers 60, 62, 64, 66, 68, and 70. More specifically, an oxygen ion conductive solid electrolyte is used as the material of these layers 60, 62, 64, 66, 68, and 70. Examples of the oxygen ion conductive solid electrolyte include zirconia ($ZrO_2$). These layers 60, 62, 64, 66, 68, 70 are highly airtight. The sensor element 12 can be manufactured as follows. Specifically, predetermined processing, printing of predetermined patterns, and the like are performed on ceramic green sheets corresponding to the respective layers. Thereafter, these ceramic green sheets are laminated. Then, these ceramic green sheets are integrated by firing. In this way, the sensor element 12 can be manufactured. The material of these layers 60, 62, 64, 66, 68, and 70 is not limited to the solid electrolyte. For example, any of these layers 60, 62, 64, 66, 68, and 70 may be formed of an insulator. As such an insulator, for example, insulating ceramics or the like can be used. Examples of such insulating ceramics include alumina and the like.

A measured gas flow path (measured gas flow portion) 79 through which the measured gas flows is formed inside the sensor element 12. The flow direction of the measured gas in the measured gas flow path 79 is the longitudinal direction of the measured gas flow path 79. The measured gas flow path 79 is formed in the spacer layer 68. That is, the measured gas flow path 79 is formed by hollowing out a part of the spacer layer 68. The side surface of the measured gas flow path 79 is defined by the spacer layer 68. The bottom surface (lower surface) of the measured gas flow path 79 is defined by the upper surface of the solid electrolyte layer 66. The top surface (upper surface) of the measured gas flow path 79 is defined by the lower surface of the solid electrolyte layer 70. One end of the measured gas flow path 79 is a gas inlet 80 through which the measured gas is introduced. That is, the gas inlet 80 is on the left side of FIG. 2. The gas inlet 80 is located on the front end side which is one side in the longitudinal direction of the sensor element 12. That is, the gas inlet 80 is located on the front end side which is one side in the longitudinal direction of the laminate 13.

In the measured gas flow path 79, a first diffusion control portion 82 is provided at the rear stage of the gas inlet 80. The first diffusion control portion 82 includes, for example, two slits. The longitudinal direction of the slits is, for example, a direction perpendicular to the drawing sheet of FIG. 2. A buffer space 84 is provided at the rear stage of the first diffusion control portion 82. A second diffusion control portion 86 is provided at the rear stage of the buffer space 84. The second diffusion control portion 86 includes, for example, two slits. The longitudinal direction of the slits is, for example, a direction perpendicular to the drawing sheet of FIG. 2. A first internal cavity 88 is provided at the rear stage of the second diffusion control portion 86. The first internal cavity 88 communicates with the buffer space 84 via the second diffusion control portion 86. A third diffusion control portion 90 is provided at the rear stage of the first internal cavity 88. The third diffusion control portion 90 includes, for example, two slits. The longitudinal direction of the slits is, for example, a direction perpendicular to the drawing sheet of FIG. 2. A second internal cavity 92 is provided at the rear stage of the third diffusion control portion 90. The second internal cavity 92 communicates with the first internal cavity 88 via the third diffusion control portion 90. A fourth diffusion control portion 94 is provided at the rear stage of the second internal cavity 92. The fourth diffusion control portion 94 includes, for example, one slit. The longitudinal direction of the slit is, for example, a direction perpendicular to the drawing sheet of FIG. 2. A third internal cavity 96 is provided at the rear stage of the fourth diffusion control portion 94. The third internal cavity 96 communicates with the second internal cavity 92 via the fourth diffusion control portion 94. At least one of the first diffusion control portion 82, the second diffusion control portion 86, the third diffusion control portion 90, and the fourth diffusion control portion 94 may be formed of a porous body.

A reference gas introduction space 98 is formed inside the sensor element 12. The measured gas flow path 79 described above is located on one side in the longitudinal direction of the sensor element 12. That is, the measured gas flow path 79 is located on the front end side of the sensor element 12. The reference gas introduction space 98 is located on the other side in the longitudinal direction of the sensor element 12. That is, the reference gas introduction space 98 is located on the rear end side of the sensor element 12. The reference gas introduction space 98 is formed by hollowing out a part of the solid electrolyte layer 66. The side surface of the reference gas introduction space 98 is defined by the solid electrolyte layer 66. The lower surface of the reference gas introduction space 98 is defined by the upper surface of the solid electrolyte layer 64. The upper surface of the reference gas introduction space 98 is defined by the lower surface of the spacer layer 68. A reference gas can be introduced into the reference gas introduction space 98. The atmosphere in the space 50 (see FIG. 1) can be the reference gas. The reference gas for measuring the concentration of nitrogen oxide is, for example, atmospheric air.

An atmosphere introduction layer 100 is provided inside the sensor element 12. The atmosphere introduction layer 100 is provided, for example, between the solid electrolyte layer 64 and the solid electrolyte layer 66. A porous material is used as the material of the atmosphere introduction layer 100. More specifically, for example, porous ceramics such as porous alumina can be used as the material of the atmosphere introduction layer 100. A part of the atmosphere introduction layer 100 is exposed in the reference gas introduction space 98. A reference gas can be introduced into the atmosphere introduction layer 100 through the reference gas introduction space 98. The atmosphere introduction layer 100 is formed so as to cover a reference electrode 102 described later. The atmosphere introduction layer 100 allows the reference gas in the reference gas introduction space 98 to reach the reference electrode 102 while applying a predetermined diffusion resistance to the reference gas. A rear end portion of the atmosphere introduction layer 100 is exposed in the reference gas introduction space 98. A portion which covers the reference electrode 102, of the atmosphere introduction layer 100 is not exposed in the reference gas introduction space 98.

The reference electrode 102 is formed on the upper surface of the solid electrolyte layer 64. The planar shape of the reference electrode 102 is, for example, rectangular. The reference electrode 102 is formed directly on the solid electrolyte layer 64. A part of the reference electrode 102 is exposed in a reference gas chamber 182 in which the reference gas exists. The atmosphere introduction layer 100 exists in the reference gas chamber 182. Here, the case where the atmosphere introduction layer 100 exists in the reference gas chamber 182 will be described as an example, but the atmosphere introduction layer 100 may not exist in the reference gas chamber 182. That is, the reference gas chamber 182 may be empty. The atmosphere introduction layer 100 is formed so as to reach the reference gas introduction space 98. The reference gas chamber 182 may contain a reference gas introduced through the atmosphere introduction layer 100. The portion of the reference electrode 102 other than the portion thereof in contact with the solid electrolyte layers 64 and 66 is exposed in the reference gas chamber 182. As will be described later, the oxygen concentration (oxygen partial pressure) in the first internal cavity 88, the oxygen concentration in the second internal cavity 92, and the oxygen concentration in the third internal cavity 96 can be measured using the reference electrode 102. For example, a porous cermet can be used as the material of the reference electrode 102. The cermet is a composite material of ceramic and metal. For example, a cermet of platinum (Pt) and zirconia can be used as the material of the reference electrode 102.

The gas inlet 80 is open to the external space. The measured gas can be taken into the sensor element 12 from the external space through the gas inlet 80. The first diffusion control portion 82 applies a predetermined diffusion resistance to the measured gas taken in from the gas inlet 80. The buffer space 84 guides the measured gas introduced by the first diffusion control portion 82, to the second diffusion control portion 86. The second diffusion control portion 86 applies a predetermined diffusion resistance to the measured gas introduced from the buffer space 84 into the first internal cavity 88. The measured gas taken into the sensor element 12 through the gas inlet 80 is introduced into the first internal cavity 88 through the first diffusion control portion 82, the buffer space 84, and the second diffusion control portion 86. There is a case where the measured gas is rapidly taken into the sensor element 12 due to pressure fluctuation in the external space. In the case where the measured gas is an automobile exhaust gas, the pressure fluctuation corresponds to the exhaust pressure pulsation. Even when the measured gas is rapidly taken into the sensor element 12 due to the pressure fluctuation in the external space, the concentration fluctuation of the measured gas is canceled while the measured gas passes through the first diffusion control portion 82, the buffer space 84, and the second diffusion control portion 86. Since the measured gas in which the concentration fluctuation is canceled is introduced into the first internal cavity 88, the concentration fluctuation of the measured gas introduced into the first internal cavity 88 is almost negligible. The first internal cavity 88 is a space for adjusting the oxygen partial pressure in the measured gas introduced thereto via the second diffusion control portion 86. The oxygen partial pressure can be adjusted by operation of a main pump cell 110 described later.

The sensor element 12 further includes the main pump cell 110. The main pump cell 110 is an electrochemical pump cell formed of a pump electrode 112, an outer pump electrode 114, and the solid electrolyte layer 70 sandwiched between the pump electrode 112 and the outer pump electrode 114. The pump electrode 112 is disposed in the measured gas flow path 79 so as to extend along the flow direction of the measured gas in the measured gas flow path 79. The outer pump electrode 114 is disposed outside the laminate 13. The pump electrode 112 is formed on the inner surface of the first internal cavity 88. The outer pump electrode 114 is formed on the upper surface of the solid electrolyte layer 70. The outer pump electrode 114 is formed in a region corresponding to a region where the pump electrode 112 is formed. The outer pump electrode 114 is exposed to the external space. That is, the outer pump electrode 114 is exposed in the sensor element chamber 28 in FIG. 1.

The planar shape of the pump electrode 112 is, for example, rectangular. The pump electrode 112 can be formed of a plurality of electrodes respectively formed on the bottom surface of the first internal cavity 88 and the top surface of the first internal cavity 88. That is, the pump electrode 112 can be formed of a top pump electrode 112$a$ and a bottom pump electrode 112$b$. The top pump electrode 112$a$ and the bottom pump electrode 112$b$ are electrically connected by patterns or the like (not shown). The center line of the pump electrode 112 in the longitudinal direction coincides with the central axis of the first internal cavity 88 in the longitudinal direction in plan view. The top pump electrode 112$a$ is formed on the top surface of the first internal cavity 88. That is, the top pump electrode 112$a$ is formed on the lower surface of the solid electrolyte layer 70. The bottom pump electrode 112$b$ is formed on the bottom surface of the first internal cavity 88. That is, the bottom pump electrode 112$b$ is formed on the upper surface of the solid electrolyte layer 66.

As the material of the pump electrode 112 and the outer pump electrode 114, for example, a porous cermet can be used. For example, a cermet of platinum and zirconia containing 1% of gold (Au) can be used as the material of the pump electrode 112 and the outer pump electrode 114. As the material of the pump electrode 112 in contact with the measured gas, it is preferable to use a material whose reducing power for nitrogen oxide in the measured gas is weakened. The cermet of platinum and zirconia containing 1% of gold is a material whose reducing power for nitrogen oxide in the measured gas is weakened.

In the main pump cell 110, when a desired pump voltage Vp0 is applied across the pump electrode 112 and the outer pump electrode 114, a pump current Ip0 flows between the pump electrode 112 and the outer pump electrode 114 in the positive direction or negative direction. Accordingly, oxygen in the first internal cavity 88 can be pumped out to the external space, or oxygen in the external space can be pumped into the first internal cavity 88.

The sensor element 12 further includes an oxygen-partial-pressure detection sensor cell (main-pump-controlling oxygen-partial-pressure detection sensor cell) 120. The oxygen-partial-pressure detection sensor cell 120 is an electrochemical sensor cell for detecting the oxygen concentration (oxygen partial pressure) in the atmosphere in the first internal cavity 88. The oxygen-partial-pressure detection sensor cell 120 is formed of the pump electrode 112, the solid electrolyte layers 66 and 70, the spacer layer 68, and the reference electrode 102.

By detecting an electromotive force V0 in the oxygen-partial-pressure detection sensor cell 120, the oxygen concentration in the atmosphere in the first internal cavity 88 can be ascertained. Further, the pump current Ip0 can be controlled by feedback controlling the pump voltage Vp0 of a variable power supply 122 so that the electromotive force V0 is kept constant. Thus, the oxygen concentration in the first internal cavity 88 can be maintained at a predetermined constant value.

The third diffusion control portion 90 applies a predetermined diffusion resistance to the measured gas introduced from the first internal cavity 88 to the second internal cavity 92, and guides the measured gas to the second internal cavity 92. As described above, the oxygen concentration in the atmosphere in the first internal cavity 88 can be controlled by the main pump cell 110. The third diffusion control portion 90 applies a predetermined diffusion resistance to the measured gas whose oxygen concentration has been controlled by the main pump cell 110.

The second internal cavity 92 is a space for further adjusting the oxygen concentration of the measured gas whose oxygen concentration has been adjusted in advance in the first internal cavity 88. That is, the oxygen concentration of the measured gas introduced into the second internal cavity 92 via the third diffusion control portion 90 is further adjusted. Further adjustment of the oxygen concentration can be performed in the second internal cavity 92 by an auxiliary pump cell 124 described later. Since the oxygen concentration in the second internal cavity 92 can be kept constant with high accuracy, the gas sensor 10 can measure the concentration of nitrogen oxide with high accuracy.

The sensor element 12 further includes the auxiliary pump cell 124. The auxiliary pump cell 124 is an auxiliary electrochemical pump cell. The auxiliary pump cell 124 is formed of an auxiliary pump electrode 126, the outer pump electrode 114, and the solid electrolyte layer 70. The auxiliary pump electrode 126 is formed on the inner surface of the second internal cavity 92. Note that an outer electrode provided separately from the outer pump electrode 114 may be used for the auxiliary pump cell 124.

The auxiliary pump electrode 126 is formed in a tubular shape. The center line of the auxiliary pump electrode 126 in the longitudinal direction coincides with the central axis of the second internal cavity 92 in the longitudinal direction in plan view. The auxiliary pump electrode 126 is configured by integrally forming a top electrode portion 126$a$, a bottom electrode portion 126$b$, and side electrode portions (not shown). The top electrode portion 126$a$ is formed on the top surface of the second internal cavity 92. That is, the top electrode portion 126$a$ is formed on the lower surface of the solid electrolyte layer 70. The bottom electrode portion 126$b$ is formed on the bottom surface of the second internal cavity 92. That is, the bottom electrode portion 126$b$ is formed on the upper surface of the solid electrolyte layer 66. The side electrode portions are formed on side wall portions on both sides of the second internal cavity 92. That is, the side electrode portions are formed on the side wall surfaces (inner surfaces) of the spacer layer 68. Like the pump electrode 112, the auxiliary pump electrode 126 is preferably made of a material whose reducing power for nitrogen oxide in the measured gas is weakened.

In the auxiliary pump cell 124, when a voltage Vp1 is applied across the auxiliary pump electrode 126 and the outer pump electrode 114 by a variable power supply 132, a pump current Ip1 flows between the auxiliary pump electrode 126 and the outer pump electrode 114 in the positive direction or negative direction. Accordingly, oxygen in the second internal cavity 92 can be pumped out to the external space, or oxygen in the external space can be pumped into the second internal cavity 92.

The sensor element 12 further includes an oxygen-partial-pressure detection sensor cell (auxiliary-pump-controlling oxygen-partial-pressure detection sensor cell) 130. The oxygen-partial-pressure detection sensor cell 130 is an electrochemical sensor cell for controlling the oxygen concentration in the atmosphere in the second internal cavity 92. The oxygen-partial-pressure detection sensor cell 130 includes the auxiliary pump electrode 126, the reference electrode 102, the solid electrolyte layers 66 and 70, and the spacer layer 68.

The voltage Vp1 is controlled based on an electromotive force V1 detected by the oxygen-partial-pressure detection sensor cell 130. As described above, in the auxiliary pump cell 124, the pump current Ip1 flows between the auxiliary pump electrode 126 and the outer pump electrode 114 in accordance with the voltage Vp1 applied across the auxiliary pump electrode 126 and the outer pump electrode 114. Thus, pumping of oxygen can be performed. The oxygen partial pressure in the atmosphere in the second internal cavity 92 can be controlled to such low partial pressure as not to substantially affect the measurement of the concentration of nitrogen oxide.

A signal indicating the pump current Ip1 can be input to the oxygen-partial-pressure detection sensor cell 120. The oxygen-partial-pressure detection sensor cell 120 controls a signal indicating the electromotive force V0 based on the signal indicating the pump current Ip1. In this manner, control is thus provided so that the gradient of the oxygen partial pressure in the measured gas introduced into the second internal cavity 92 via the third diffusion control portion 90 is always constant. In the case where the gas sensor 10 is used as a gas sensor that measures the concentration of nitrogen oxide, the oxygen concentration in the atmosphere in the second internal cavity 92 can be set to a constant value of, for example, about 0.001 ppm by the operation of the main pump cell 110 and the auxiliary pump cell 124.

The fourth diffusion control portion 94 applies a predetermined diffusion resistance to the measured gas introduced from the second internal cavity 92 to the third internal cavity 96, and guides the measured gas to the third internal cavity 96. As described above, the oxygen concentration in the atmosphere in the second internal cavity 92 can be controlled by the auxiliary pump cell 124. The fourth diffusion control portion 94 applies a predetermined diffusion resistance to the measured gas whose oxygen concentration has been controlled by the auxiliary pump cell 124. The fourth diffusion control portion 94 also serves to limit the amount of nitrogen oxide flowing into the third internal cavity 96.

The measured gas whose oxygen concentration has been adjusted in advance in the second internal cavity 92 is introduced into the third internal cavity 96 via the fourth diffusion control portion 94. The third internal cavity 96 is a space for detecting the concentration of nitrogen oxide in the measured gas. That is, the third internal cavity 96 is a space for detecting the concentration of nitrogen oxide. The concentration of nitrogen oxide can be measured by operating a measurement pump cell 140 described later.

The sensor element 12 further includes the measurement pump cell 140. The measurement pump cell 140 is an electrochemical pump cell for measuring the concentration of nitrogen oxide in the measured gas introduced into the third internal cavity 96. The measurement pump cell 140 is formed of a measurement electrode 134, the outer pump electrode 114, the solid electrolyte layers 66 and 70, and the spacer layer 68. The measurement electrode 134 is formed on the upper surface of the solid electrolyte layer 66. As the material of the measurement electrode 134, for example, a porous cermet can be used. The measurement electrode 134 functions as a catalyst for reducing nitrogen oxide present in the atmosphere in the third internal cavity 96.

The measurement pump cell 140 pumps out oxygen generated by decomposition of nitrogen oxide in the atmosphere around the measurement electrode 134. A pump current Ip2 corresponding to the amount of oxygen pumped out by the measurement pump cell 140 can be detected.

The sensor element 12 further includes an oxygen-partial-pressure detection sensor cell (measurement-pump-controlling oxygen-partial-pressure detection sensor cell) 142. The oxygen-partial-pressure detection sensor cell 142 is an electrochemical sensor cell for detecting the oxygen partial pressure around the measurement electrode 134. The oxygen-partial-pressure detection sensor cell 142 is formed of the solid electrolyte layer 66, the measurement electrode 134, and the reference electrode 102. A variable power supply 144 can be controlled based on an electromotive force V2 detected by the oxygen-partial-pressure detection sensor cell 142.

The measured gas guided into the second internal cavity 92 reaches the measurement electrode 134 in the third internal cavity 96 via the fourth diffusion control portion 94 under the condition that the oxygen partial pressure is controlled. The nitrogen oxide in the measured gas around the measurement electrode 134 is reduced by the measurement electrode 134 ($2NO \rightarrow N_2+O_2$), and oxygen is generated around the measurement electrode 134. The generated oxygen is pumped by the measurement pump cell 140. At this time, the voltage Vp2 of the variable power supply 144 is controlled so that the electromotive force V2 detected by the oxygen-partial-pressure detection sensor cell 142 is kept constant. The amount of oxygen generated around the measurement electrode 134 is proportional to the concentration of nitrogen oxide in the measured gas. Therefore, the concentration of the nitrogen oxide in the measured gas can be calculated based on the pump current Ip2 in the measurement pump cell 140.

The sensor element 12 further includes a sensor cell 146. The sensor cell 146 is an electrochemical sensor cell formed of the solid electrolyte layers 64, 66, and 70, the spacer layer 68, the outer pump electrode 114, and the reference electrode 102. The oxygen partial pressure in the measured gas outside the sensor element 12 can be detected based on an electromotive force Vref obtained by the sensor cell 146.

The sensor element 12 further includes a reference gas adjustment pump cell 150. The reference gas adjustment pump cell 150 is an electrochemical pump cell formed of the solid electrolyte layers 64, 66, and 70, the spacer layer 68, the outer pump electrode 114, and the reference electrode 102. The reference gas adjustment pump cell 150 performs pumping as a voltage Vp3 applied by a variable power supply 152 connected between the outer pump electrode 114 and the reference electrode 102 causes a control current Ip3 to flow. The reference gas adjustment pump cell 150 can pump oxygen into the atmosphere introduction layer 100 located around the reference electrode 102, from the sensor element chamber 28 (see FIG. 1) located around the outer pump electrode 114. The voltage Vp3 of the variable power supply 152 is a DC voltage such that the control current Ip3 has a predetermined value, and is determined in advance. That is, the voltage Vp3 of the variable power supply 152 is determined in advance as a DC voltage such that the control current Ip3 becomes a DC current with a constant value.

In this gas sensor 10, the main pump cell 110 and the auxiliary pump cell 124 operate to supply, to the measurement pump cell 140, the measured gas whose oxygen partial pressure is kept at a constant low value. That is, the measured gas whose oxygen partial pressure is kept at a value that does not substantially affect the measurement of the concentration of nitrogen oxide is supplied to the measurement pump cell 140. Then, oxygen in an amount substantially proportional to the concentration of the nitrogen oxide in the measured gas is generated by reduction of the nitrogen oxide. The oxygen thus generated is pumped out by the measurement pump cell 140. Since the pump current Ip2 flows in accordance with the amount of oxygen pumped out by the measurement pump cell 140, the concentration of the nitrogen oxide in the measured gas can be detected based on the pump current Ip2.

The sensor element 12 further includes a heater unit 160 for heating the sensor element 12 and keeping the temperature thereof. The heater unit 160 serves to adjust the temperature of the sensor element 12. By heating the solid electrolyte provided in the sensor element 12, the oxygen ion conductivity of the solid electrolyte can be increased. The heater unit 160 includes a heater connector electrode 162, a heater 164, a through hole 166, a heater insulating layer 168, a pressure release hole 170, and a lead wire 172.

The heater connector electrode 162 is formed, for example, on the lower surface of the first substrate layer 60. By electrically connecting the heater connector electrode 162 to an external power supply, power can be supplied from the external power supply to the heater unit 160.

The heater 164 is sandwiched between the second substrate layer 62 and the solid electrolyte layer 64 from above and below. The heater 164 is formed of, for example, an electric resistor. The heater 164 is connected to the heater connector electrode 162 via the lead wire 172 and the through hole 166. The heater 164 generates heat by being supplied with power from the outside via the heater connector electrode 162. The heater 164 can heat and keep the temperature of the solid electrolyte forming the sensor element 12.

In plan view, the region from the first internal cavity 88 to the third internal cavity 96 overlaps the region in which the heater 164 is formed. Therefore, a portion which needs to be activated, of the solid electrolyte provided in the sensor element 12 can be sufficiently activated by the heater 164.

The heater insulating layer 168 is formed so as to cover the upper surface, the lower surface, and the side surfaces of the heater 164. As the material of the heater insulating layer 168, for example, an insulator can be used. More specifically, for example, porous alumina or the like can be used as the material of the heater insulating layer 168. The heater insulating layer 168 is provided to ensure electrical insulation between the second substrate layer 62 and the heater 164 and electrical insulation between the solid electrolyte layer 64 and the heater 164.

The pressure release hole 170 penetrates through the solid electrolyte layer 64 and the atmosphere introduction layer 100 and communicates with the reference gas introduction space 98. The pressure release hole 170 is formed for the purpose of reducing an increase in internal pressure due to an increase in temperature of the heater insulating layer 168.

The variable power supplies 122, 132, 144, 152 and the like are actually connected to the respective electrodes via lead wires (not shown) formed in the sensor element 12, the connector 24 (see FIG. 1), and the lead wires 54 (see FIG. 1).

Figure 3A:
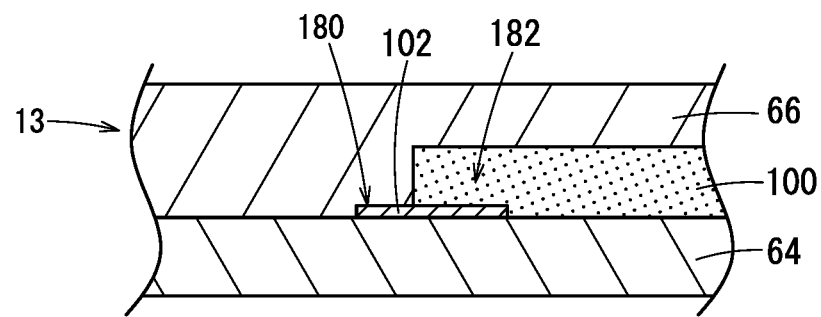
FIGS. 3A and 3B are diagrams each showing an example of a part of a sensor element according to an embodiment.
Figure 3B:
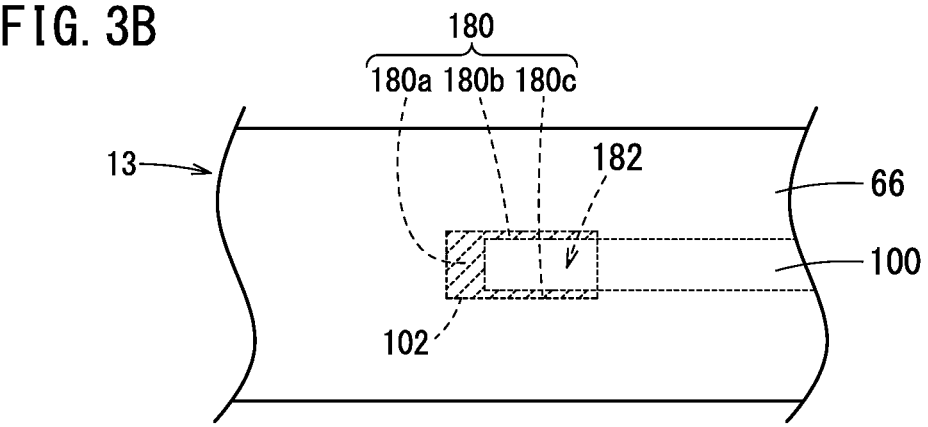

FIGS. 3A and 3B are diagrams each showing an example of a part of the sensor element according to the present embodiment. FIG. 3A is an enlarged cross-sectional view of a part of FIG. 2. FIG. 3B is a plan view corresponding to FIG. 3A.

As shown in FIGS. 3A and 3B, a portion which is not exposed in the reference gas chamber 182, of the reference electrode 102 is embedded in the laminate 13 (see FIG. 2). That is, the portion which is not exposed in the reference gas chamber 182, of the reference electrode 102 is sandwiched between the solid electrolyte layer 64 and the solid electrolyte layer 66 as shown in FIGS. 3A and 3B. The portion which is sandwiched between the solid electrolyte layer 64 and the solid electrolyte layer 66, of the reference electrode 102 is referred to as a sandwiched portion 180. In the example shown in FIG. 3B, the sandwiched portion 180 includes a portion 180*a* corresponding to a side of the reference electrode 102 on the front end side. In the example shown in FIG. 3B, the sandwiched portion 180 further includes a portion 180*b* corresponding to one side of the reference electrode 102. In the example shown in FIG. 3B, the sandwiched portion 180 further includes a portion 180*c* corresponding to another side of the reference electrode 102. That is, in the example shown in FIG. 3B, three sides of the reference electrode 102 are sandwiched between the solid electrolyte layer 64 and the solid electrolyte layer 66.

In the present embodiment, a part of the reference electrode 102 is sandwiched between the solid electrolyte layer 64 and the solid electrolyte layer 66 for the following reason. That is, in order to maintain the measurement accuracy of the gas sensor 10, oxygen may be pumped in by applying a voltage across the outer pump electrode 114 or the like and the reference electrode 102. When oxygen is pumped in, the oxygen concentration temporarily increases around the reference electrode 102 and in the reference gas chamber 182. While the gas sensor 10 is repeatedly used over a long period of time, platinum contained in the reference electrode 102 is oxidized to form platinum oxide. In a severe use environment such as a high temperature, platinum is more likely to be oxidized, and thus platinum oxide is more likely to be generated. Platinum oxide is more likely to sublime than platinum. Therefore, when platinum oxide is generated in the reference electrode 102, the platinum oxide may sublime and peeling may occur at the interface between the reference electrode 102 and the solid electrolyte layer 64. Therefore, in the present embodiment, in order to prevent the peeling of the reference electrode 102, a part of the reference electrode 102 is sandwiched between the solid electrolyte layer 64 and the solid electrolyte layer 66.

Although FIG. 3B shows an example in which the sandwiched portion 180 is disposed at the portions corresponding to three sides of the reference electrode 102, the present invention is not limited thereto. For example, the sandwiched portion 180 may be provided at a portion corresponding to one side of the reference electrode 102. Further, the sandwiched portion 180 may be provided at portions corresponding to two sides of the reference electrode 102.

A portion which is not sandwiched between the solid electrolyte layers 64 and 66, of the reference electrode 102 is in contact with the atmosphere introduction layer 100. The atmosphere introduction layer 100 is formed of a porous material. Since the porous material is not dense and has low airtightness, and therefore cannot suppress sublimation of platinum oxide. That is, the atmosphere introduction layer 100 covering the reference electrode 102 does not contribute to prevention of peeling of the reference electrode 102.

In order to prevent peeling of the reference electrode 102, it is preferable to secure a certain amount of area of the sandwiched portion 180. That is, an area of the portion which is sandwiched between the solid electrolyte layer 64 and the solid electrolyte layer 66, of the reference electrode 102 is defined as a first area S1. An area of the portion which is exposed in the reference gas chamber 182, of the reference electrode 102 is defined as a second area S2. The ratio (S1/S2) of the first area S1 to the second area S2 is preferably 0.3 or more.

Figure 4A:
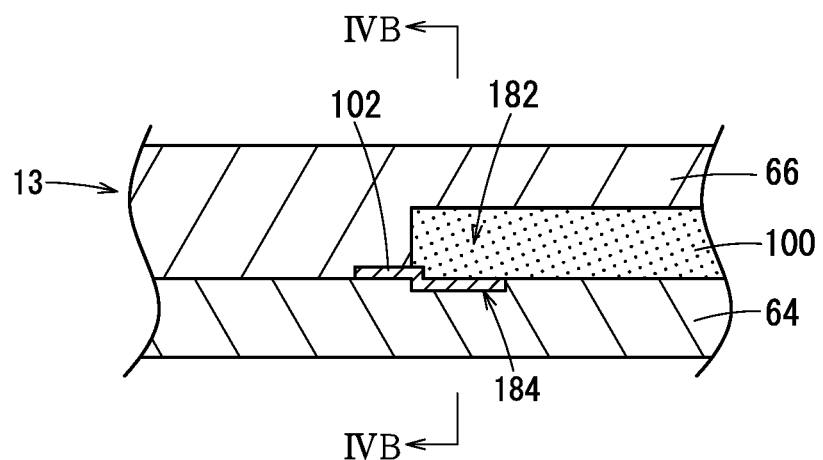
FIGS. 4A and 4B are diagrams each showing an example of a part of the sensor element according to the embodiment.
Figure 4B:
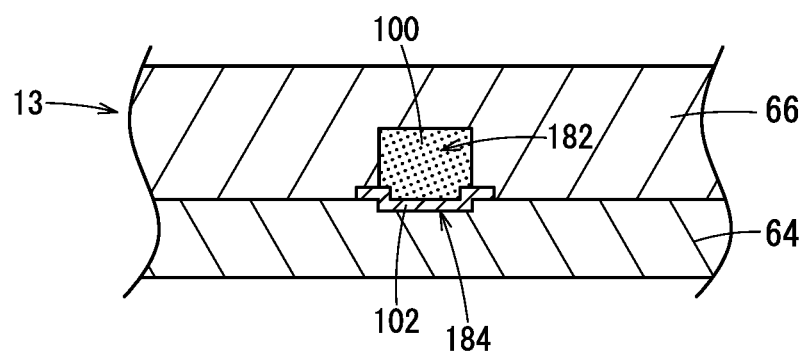

FIGS. 4A and 4B are diagrams each showing an example of a part of the sensor element according to the present embodiment. FIGS. 4A and 4B are enlarged cross-sectional views of a part of FIG. 2. FIG. 4B corresponds to a cross section taken along line IVB-IVB of FIG. 4A.

In the examples shown in FIGS. 4A and 4B, a recess 184 is formed in the solid electrolyte layer 64 so as to correspond to a portion which is exposed in the reference gas chamber 182, of the reference electrode 102. At least a part of the portion which is exposed in the reference gas chamber 182, of the reference electrode 102 is provided in the recess 184. Since a part of the reference electrode 102 is provided in the recess 184, the area of contact between the reference electrode 102 and the laminate 13 is large. Since the area of contact between the reference electrode 102 and the laminate 13 is large, peeling of the reference electrode 102 can be further suppressed in the examples shown in FIGS. 4A and 4B.

Figure 5A:
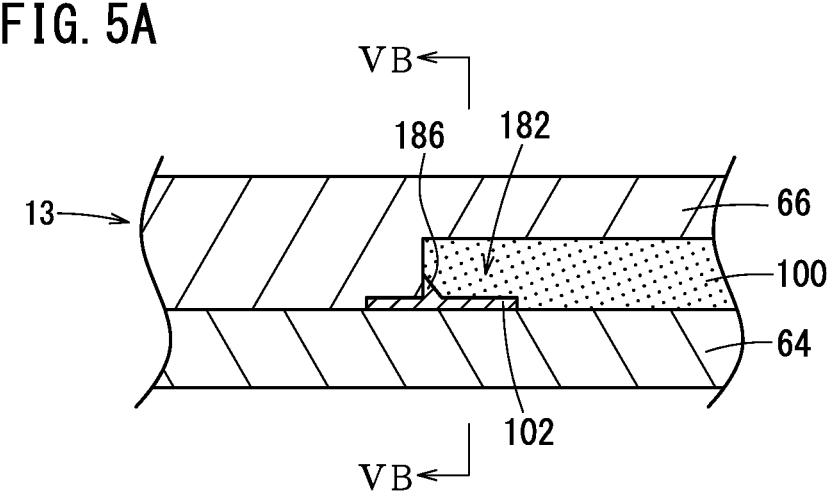
FIGS. 5A and 5B are diagrams each showing an example of a part of the sensor element according to the embodiment.
Figure 5B:
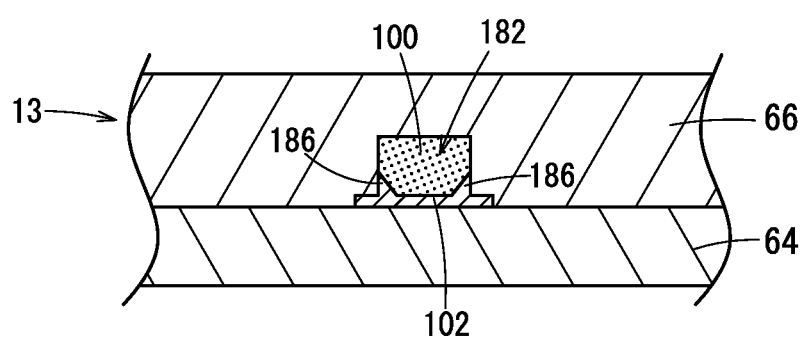

FIGS. 5A and 5B are diagrams each showing an example of a part of the sensor element according to the present embodiment. FIGS. 5A and 5B are enlarged cross-sectional views of a part of FIG. 2. FIG. 5B corresponds to a cross section taken along line VB-VB of FIG. 5A.

In the examples shown in FIGS. 5A and 5B, a protruding portion 186 is formed in the reference electrode 102. The reference electrode 102 having the protruding portion 186 can be formed by, for example, a printing method. The protruding portion 186 is in contact with the side surface of the reference gas chamber 182 and protrudes into the reference gas chamber 182. Since the protruding portion 186 in contact with the side surface of the reference gas chamber 182 is formed in the reference electrode 102, the area of contact between the reference electrode 102 and the laminate 13 is large in the examples shown in FIGS. 5A and 5B. Since the area of contact between the reference electrode 102 and the laminate 13 is large, peeling of the reference electrode 102 can be further suppressed in the examples shown in FIGS. 5A and 5B.

Figure 6:
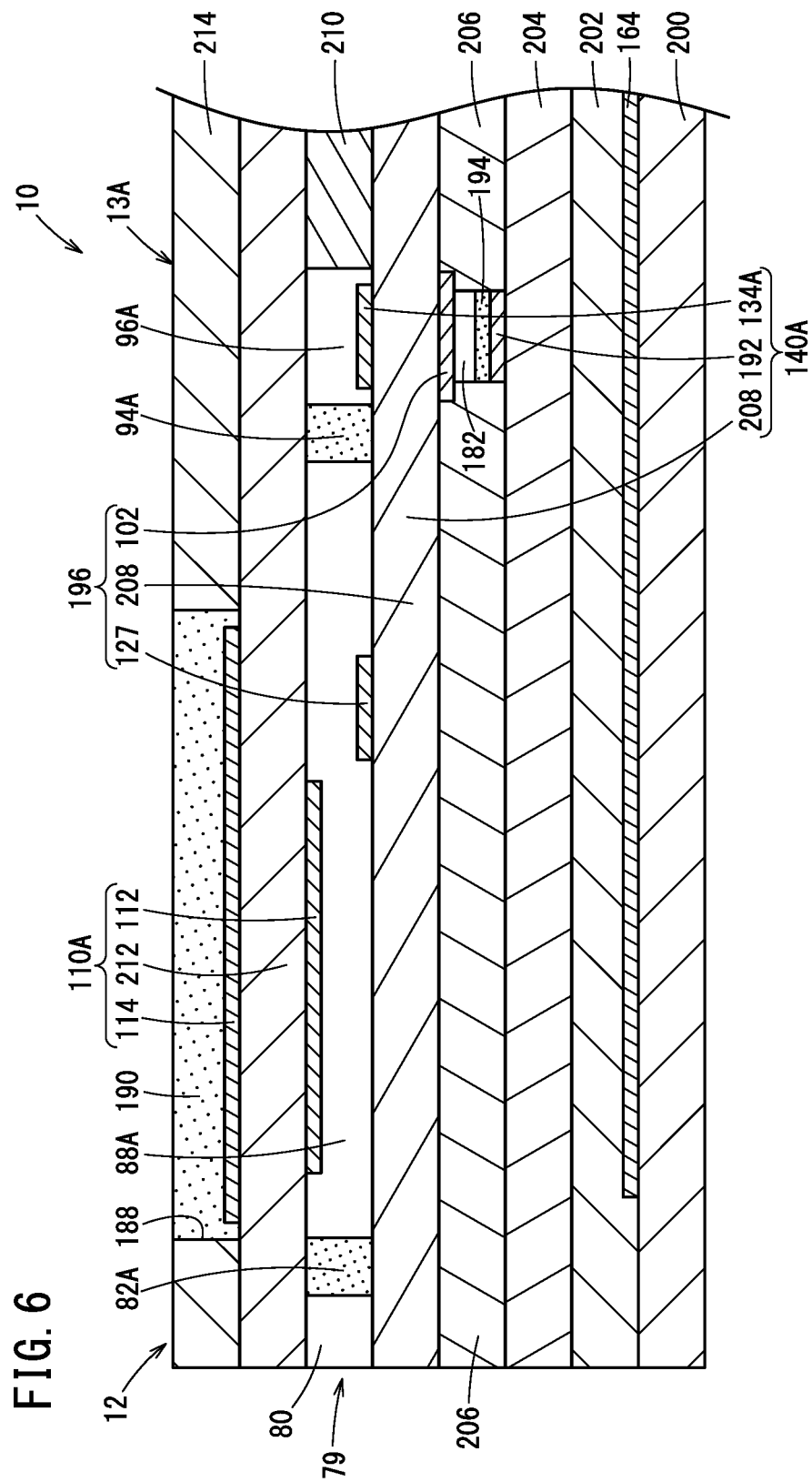
FIG. 6 is a cross-sectional view showing another example of the gas sensor according to the embodiment.

Another example of the gas sensor 10 according to the present embodiment will be described with reference to FIG. 6. FIG. 6 is a cross-sectional view showing another example of the gas sensor according to the present embodiment.

In the example shown in FIG. 6, a laminate 13A is formed of a first substrate layer 200, a second substrate layer 202, a solid electrolyte layer 204, an insulator layer 206, a solid electrolyte layer 208, a spacer layer 210, a solid electrolyte layer 212, and a cap layer 214. The second substrate layer 202 is laminated on the first substrate layer 200. The solid electrolyte layer 204 is laminated on the second substrate layer 202. The insulator layer 206 is laminated on the solid electrolyte layer 204. The solid electrolyte layer 208 is laminated on the insulator layer 206. The spacer layer 210 is formed on the solid electrolyte layer 208. The solid electrolyte layer 212 is laminated on the spacer layer 210. The cap layer 214 is formed on the solid electrolyte layer 212. As the material of the layers 200, 202, 206, 210, and 214, for example, an insulator can be used. As the insulator, for example, porous ceramics such as porous alumina can be used. As the material of the layers 204, 208, and 212, for example, a solid electrolyte such as zirconia can be used.

A measured gas flow path 79 is formed in the spacer layer 210. In the measured gas flow path 79, a diffusion control portion 82A is provided at the rear stage of a gas inlet 80. As the material of the diffusion control portion 82A, for example, porous ceramics such as porous alumina can be used.

An internal cavity 88A is provided at the rear stage of the diffusion control portion 82A. The measured gas can flow into the internal cavity 88A via the diffusion control portion 82A.

A pump electrode 112 is formed in the internal cavity 88A. The pump electrode 112 is formed on the lower surface of the solid electrolyte layer 212. An outer pump electrode 114 is formed on the upper surface of the solid electrolyte layer 212. The outer pump electrode 114 is covered with a porous layer 190 embedded in an opening portion 188 formed in the cap layer 214. As the material of the porous layer 190, for example, porous ceramics such as porous alumina can be used. The pump electrode 112, the solid electrolyte layer 212, and the outer pump electrode 114 constitute a pump cell 110A.

An electrode 127 is formed in the internal cavity 88A. The electrode 127 is formed on the upper surface of the solid electrolyte layer 208. The electrode 127 is located downstream of the pump electrode 112.

A diffusion control portion 94A is provided at the rear stage of the internal cavity 88A. As the material of the diffusion control portion 94A, for example, porous ceramics such as porous alumina can be used. An internal cavity 96A is provided at the rear stage of the diffusion control portion 94A. The measured gas can flow into the internal cavity 96A via the diffusion control portion 94A.

A measurement electrode 134A is formed in the internal cavity 96A. The measurement electrode 134A is formed on the upper surface of the solid electrolyte layer 208.

A reference gas chamber (reference oxygen chamber) 182 is formed in the insulator layer 206. A reference electrode 102 is formed on the top surface of the reference gas chamber 182. That is, the reference electrode 102 is formed on the lower surface of the solid electrolyte layer 208. The reference electrode 102 is exposed in the reference gas chamber 182. Thus, the reference electrode 102 may be formed on the top surface of the reference gas chamber 182. The reference electrode 102, the solid electrolyte layer 208, and the electrode 127 constitute a reference cell 196.

An electrode 192 is formed on the bottom surface of the reference gas chamber 182. The electrode 192 is covered with an insulating protective layer 194 made of, for example, a porous material. The electrode 192, the solid electrolyte layer 208, and the measurement electrode 134A constitute a measurement pump cell 140A.

In the example shown in FIG. 6, four sides of the reference electrode 102 are embedded in the laminate 13A. More specifically, four sides of the reference electrode 102 are sandwiched between the solid electrolyte layer 208 and the insulator layer 206. In this manner, four sides of the reference electrode 102 may be embedded in the laminate 13A. That is, the entire circumference of the reference electrode 102 may be embedded in the laminate 13A.

EXAMPLES

In Examples 1 to 12 and Comparative Examples 1 to 7, a peeling test was performed on the reference electrode 102. The shape of the reference electrode 102 was rectangular in plan view. The test results are shown in Table 1 of FIG. 7. FIG. 7 is a diagram showing Table 1 illustrating test results. FIGS. 8A to 10C are diagrams each showing an example of layout when a peeling test is performed.

Figure 8D:
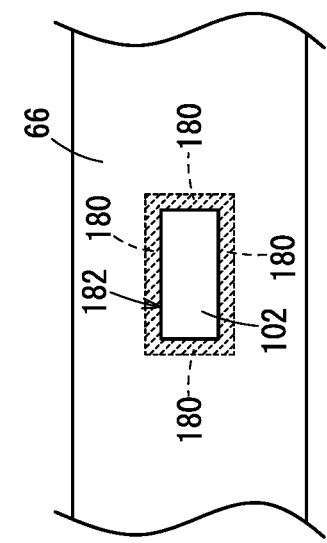
FIGS. 8A, 8B, 8C, 8D, and 8E are diagrams each showing an example of layout when a peeling test is performed.
Figure 8E:
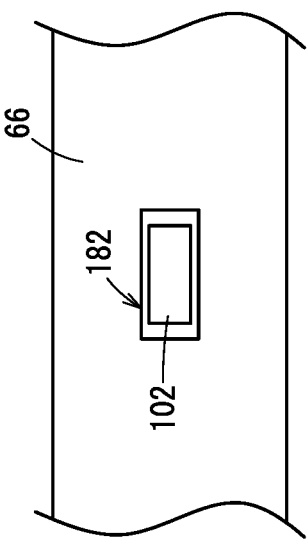
Figure 8A:
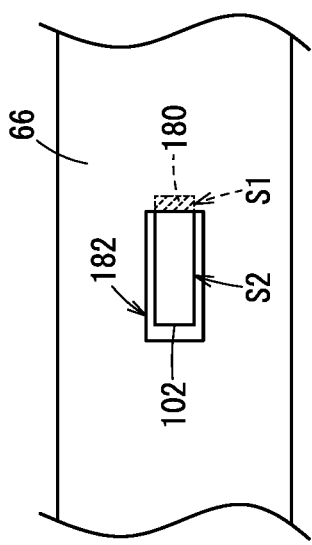
Figure 8B:
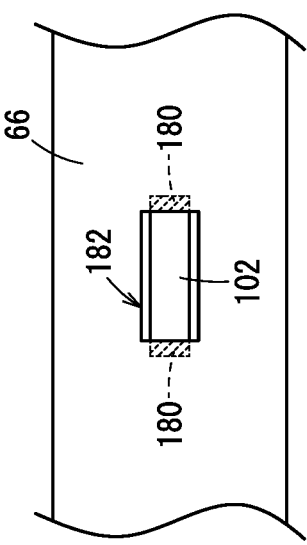
Figure 8C:
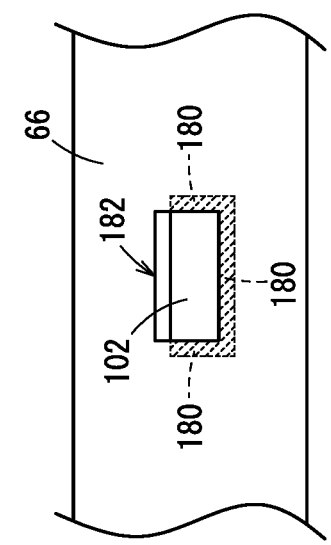

In the layout shown in FIG. 8A, a portion corresponding to one side of the reference electrode 102 is sandwiched between the solid electrolyte layer 64 and the solid electrolyte layer 66. That is, the layout shown in FIG. 8A is the layout of type A. In the layout shown in FIG. 8A, one short side was sandwiched between the solid electrolyte layer 64 and the solid electrolyte layer 66. In the layout shown in FIG. 8B, portions corresponding to two sides of the reference electrode 102 were sandwiched between the solid electrolyte layer 64 and the solid electrolyte layer 66. That is, the layout shown in FIG. 8B is the layout of type B. In the layout shown in FIG. 8B, two short sides facing each other were sandwiched between the solid electrolyte layer 64 and the solid electrolyte layer 66. In the layout shown in FIG. 8C, portions corresponding to three sides of the reference electrode 102 were sandwiched between the solid electrolyte layer 64 and the solid electrolyte layer 66. That is, the layout shown in FIG. 8C is the layout of type C. In the layout shown in FIG. 8C, one long side and two short sides facing each other were sandwiched between the solid electrolyte layer 64 and the solid electrolyte layer 66. In the layout shown in FIG. 8D, portions corresponding to four sides of the reference electrode 102 were sandwiched between the solid electrolyte layer 64 and the solid electrolyte layer 66. That is, the layout shown in FIG. 8D is the layout of type D. In the layout shown in FIG. 8E, none of the portions corresponding to the four sides of the reference electrode 102 was sandwiched between the solid electrolyte layer 64 and the solid electrolyte layer 66. That is, the layout shown in FIG. 8E is the layout of type E.

Figure 9D:
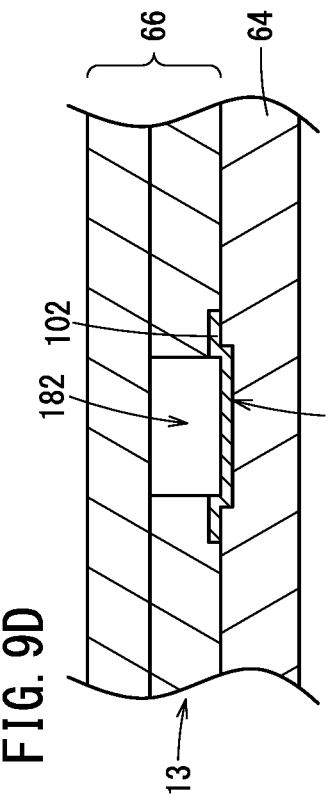
FIGS. 9A, 9B, 9C, 9D, 9E, and 9F are diagrams each showing an example of layout when the peeling test is performed.
Figure 9E:
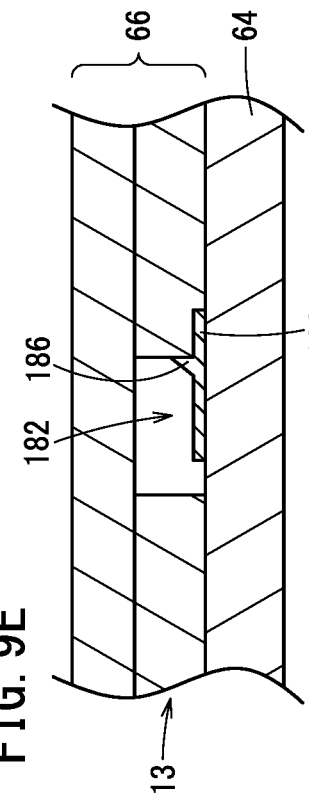
Figure 9F:
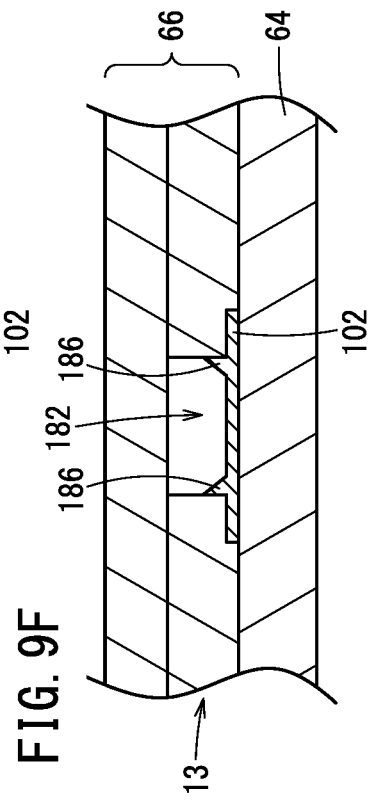
Figure 9A:
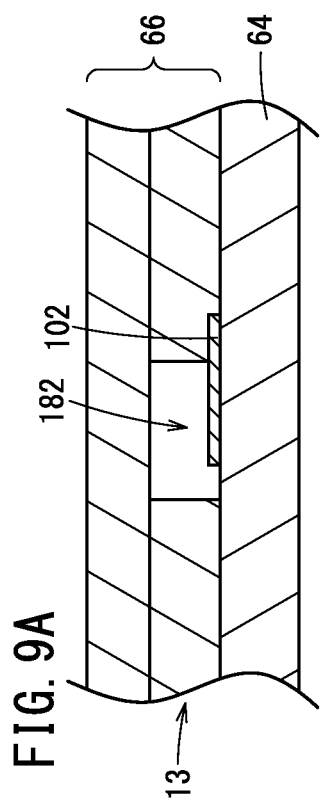
Figure 9B:
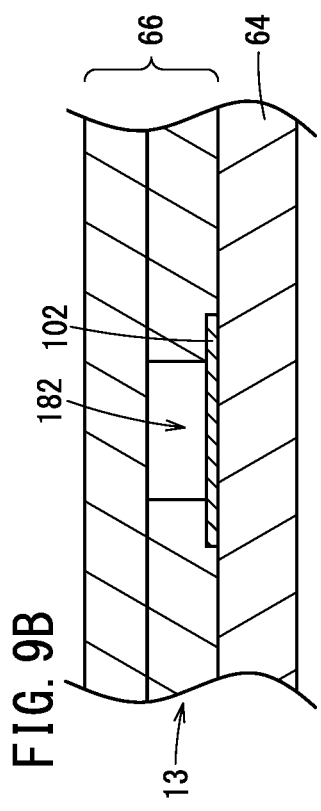

FIGS. 9A and 9B are cross-sectional views corresponding to an example in which neither the recess 184 nor the protruding portion 186 is formed. FIG. 9A corresponds to the layout shown in FIG. 8A. FIG. 9B corresponds to the layout shown in FIGS. 8B to 8D.

Figure 9C:
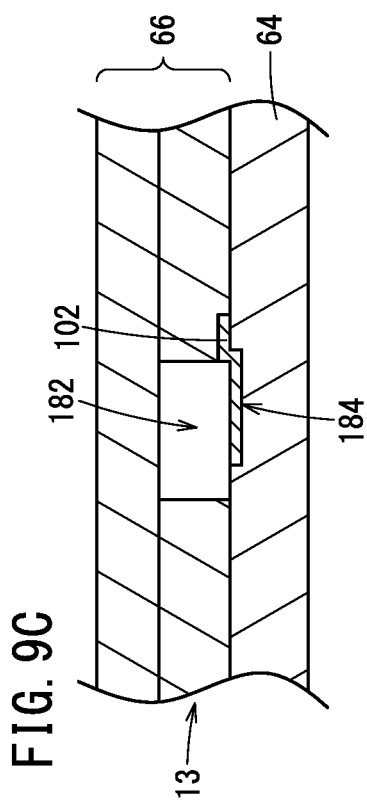

FIGS. 9C and 9D are cross-sectional views corresponding to an example in which the recess 184 is formed. FIG. 9C corresponds to the layout shown in FIG. 8A. FIG. 9D corresponds to the layout shown in FIGS. 8B to 8D.

FIGS. 9E and 9F are cross-sectional views corresponding to an example in which the protruding portion 186 is formed. FIG. 9E corresponds to the layout shown in FIG. 8A. FIG. 9F corresponds to the layout shown in FIGS. 8B to 8D.

Figure 10A:
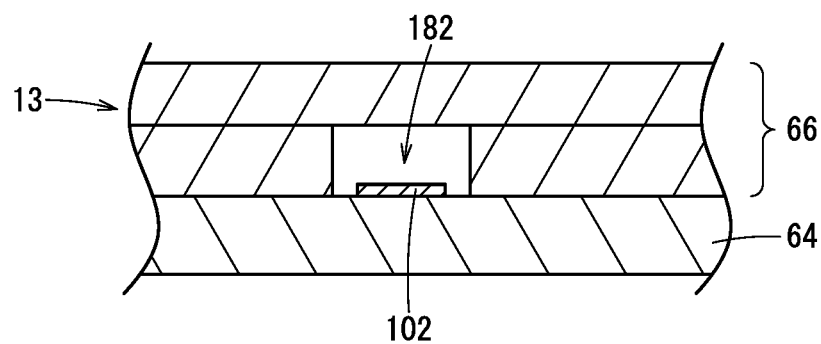
FIGS. 10A, 10B, and 10C are diagrams each showing an example of layout when the peeling test is performed.

FIG. 10A is a cross-sectional view corresponding to an example in which neither the recess 184 nor the protruding portion 186 is formed. FIG. 10A corresponds to the layout shown in FIG. 8E.

Figure 10B:
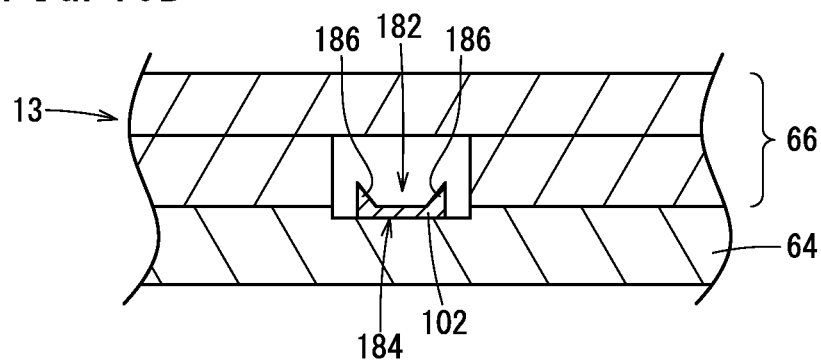

FIG. 10B is a cross-sectional view corresponding to an example in which the recess 184 and the protruding portion 186 are formed. FIG. 10B corresponds to the layout shown in FIG. 8E.

Figure 10C:
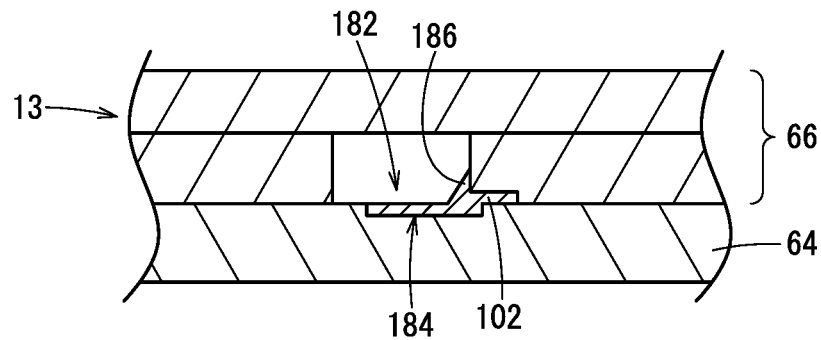

FIG. 10C is a cross-sectional view corresponding to an example in which the recess 184 and the protruding portion 186 are formed. FIG. 10C corresponds to the layout shown in FIG. 8A.

The peeling test for the reference electrode 102 was performed as follows. Specifically, the gas sensor 10 was placed in an air atmosphere at room temperature, and a test cycle including an ON state for 70 seconds and an OFF state for 50 seconds following the ON state was repeated 100,000 times. In the ON state, a predetermined voltage was applied to each part of the gas sensor 10. In the OFF state, no voltage was applied to each part of the gas sensor 10. In the ON state, power was supplied to the heater 164. In the ON state, signals were transmitted to and received from the gas sensor 10. In the OFF state, power supply to the heater 164 was stopped. In the OFF state, transmission and reception of signals to and from the gas sensor 10 were stopped. During the peeling test, the main pump cell 110 continued to operate. That is, the pump current Ip0 was kept at 15$p$ A. After the peeling test was completed, the pump electrode 112 was observed. When the pump electrode 112 was observed, X-ray CT was used. Further, when the pump electrode 112 was observed, the pump electrode 112 was cut as necessary.

The evaluation criteria of the result of the peeling test for the reference electrode 102 are as follows.

A: The adhesion area between the reference electrode 102 and the solid electrolyte layer 64 after the test is 90% or more of the adhesion area between the reference electrode 102 and the solid electrolyte layer 64 before the test.

B: The adhesion area between the reference electrode 102 and the solid electrolyte layer 64 after the test is 70% or more and less than 90% of the adhesion area between the reference electrode 102 and the solid electrolyte layer 64 before the test. That is, the area of the peeled portion of the reference electrode 102 is less than 30% of the area of the reference electrode 102.

C: The adhesion area between the reference electrode 102 and the solid electrolyte layer 64 after the test is 30% or more and less than 70% of the adhesion area between the reference electrode 102 and the solid electrolyte layer 64 before the test.

D: The adhesion area between the reference electrode 102 and the solid electrolyte layer 64 after the test is less than 30% of the adhesion area between the reference electrode 102 and the solid electrolyte layer 64 before the test. That is, it is not acceptable.

Example 1

In Example 1, the layout of the sandwiched portion 180 was Type A. That is, as shown in FIG. 8A, the sandwiched portion 180 was disposed only at a portion corresponding to one side of the reference electrode 102. The ratio (S1/S2) of the first surface S1 to the second surface S2 was 0.3. As described above, the first area S1 is the area of the portion which is sandwiched between the solid electrolyte layer 64 and the solid electrolyte layer 66, of the reference electrode 102. As described above, the second area S2 is the area of the portion which is exposed in the reference gas chamber 182, of the reference electrode 102. As shown in FIG. 9A, the recess 184 was not formed. Further, as shown in FIG. 9A, the protruding portion 186 was not formed. The evaluation result of the peeling test for the reference electrode 102 was C.

Example 2

In Example 2, the layout of the sandwiched portion 180 was type A. That is, as shown in FIG. 8A, the sandwiched portion 180 was disposed only at a portion corresponding to one side of the reference electrode 102. The ratio (S1/S2) of the first area S1 to the second area S2 was 0.3. As shown in FIG. 9E, the recess 184 was not formed. Further, as shown in FIG. 9E, the protruding portion 186 was formed. The evaluation result of the peeling test for the reference electrode 102 was B.

Example 3

In Example 3, the layout of the sandwiched portion 180 was type A. That is, as shown in FIG. 8A, the sandwiched portion 180 was disposed only at a portion corresponding to one side of the reference electrode 102. The ratio (S1/S2) of the first area S1 to the second area S2 was 0.3. As shown in FIG. 9C, the recess 184 was formed. As shown in FIG. 9C, the protruding portion 186 was not formed. The evaluation result of the peeling test for the reference electrode 102 was A.

Example 4

In Example 4, the layout of the sandwiched portion 180 was type B. That is, as shown in FIG. 8B, the sandwiched portions 180 were disposed at portions corresponding to two sides of the reference electrode 102 that face each other. was 0.3. As shown in FIG. 9E, the recess 184 was not formed. As shown in FIG. 9E, the protruding portion 186 was formed. The evaluation result of the peeling test for the reference electrode 102 was B.

Example 5

In Example 5, the layout of the sandwiched portion 180 was type B. That is, as shown in FIG. 8B, the sandwiched portions 180 were disposed at portions corresponding to two sides of the reference electrode 102 that face each other. The ratio (S1/S2) of the first area S1 to the second area S2 was 0.3. As shown in FIG. 9D, the recess 184 was formed. As shown in FIG. 9D, the protruding portion 186 was not formed. The evaluation result of the peeling test for the reference electrode 102 was A.

Example 6

In Example 6, the layout of the sandwiched portion 180 was type D. That is, as shown in FIG. 8D, the sandwiched portions 180 were disposed at portions corresponding to four sides of the reference electrode 102. The ratio (S1/S2) of the first area S1 to the second area S2 was 0.3. As shown in FIG. 9B, the recess 184 was not formed. As shown in FIG. 9B, the protruding portion 186 was not formed. The evaluation result of the peeling test for the reference electrode 102 was A.

Example 7

In Example 7, the layout of the sandwiched portion 180 was type B. That is, as shown in FIG. 8B, the sandwiched portions 180 were disposed at portions corresponding to two sides of the reference electrode 102 that face each other. The ratio (S1/S2) of the first area S1 to the second area S2 was 0.5. As shown in FIG. 9B, the recess 184 was not formed. As shown in FIG. 9B, the protruding portion 186 was not formed. The evaluation result of the peeling test for the reference electrode 102 was B.

Example 8

In Example 8, the layout of the sandwiched portion 180 was type B. That is, as shown in FIG. 8B, the sandwiched portions 180 were disposed at portions corresponding to two sides of the reference electrode 102 that face each other. The ratio (S1/S2) of the first area S1 to the second area S2 was 0.8. As shown in FIG. 9B, the recess 184 was not formed. As shown in FIG. 9B, the protruding portion 186 was not formed. The evaluation result of the peeling test for the reference electrode 102 was A.

Example 9

In Example 9, the layout of the sandwiched portion 180 was type B. That is, as shown in FIG. 8B, the sandwiched portions 180 were disposed at portions corresponding to two sides of the reference electrode 102 that face each other. The ratio (S1/S2) of the first area S1 to the second area S2 was 0.8. As shown in FIG. 9D, the recess 184 was formed. As shown in FIG. 9D, the protruding portion 186 was not formed. The evaluation result of the peeling test for the reference electrode 102 was A.

Example 10

In Example 10, the layout of the sandwiched portion 180 was type C. That is, as shown in FIG. 8C, the sandwiched portions 180 were disposed at portions corresponding to three sides of the reference electrode 102. The ratio (S1/S2) of the first area S1 to the second area S2 was 1.0. As shown in FIG. 9F, the recess 184 was not formed. As shown in FIG. 9F, the protruding portion 186 was formed. The evaluation result of the peeling test for the reference electrode 102 was A.

Example 11

In Example 11, the layout of the sandwiched portion 180 was type D. That is, as shown in FIG. 8D, the sandwiched portions 180 were disposed at portions corresponding to four sides of the reference electrode 102. The ratio (S1/S2) of the first area S1 to the second area S2 was 1.2. As shown in FIG. 9B, the recess 184 was not formed. As shown in FIG. 9B, the protruding portion 186 was not formed. The evaluation result of the peeling test for the reference electrode 102 was A.

Example 12

In Example 12, the layout of the sandwiched portion 180 was type D. That is, as shown in FIG. 8D, the sandwiched portions 180 were disposed at portions corresponding to four sides of the reference electrode 102. The ratio (S1/S2) of the first area S1 to the second area S2 was 1.5. As shown in FIG. 9B, the recess 184 was not formed. As shown in FIG. 9B, the protruding portion 186 was not formed. The evaluation result of the peeling test for the reference electrode 102 was A.

Comparative Example 1

In Comparative Example 1, the layout of the sandwiched portion 180 was Type E. That is, as shown in FIG. 8E, the sandwiched portion 180 was not disposed at any of the portions corresponding to the four sides of the reference electrode 102. The ratio (S1/S2) of the first area S1 to the second area S2 was 0. As shown in FIG. 10A, the recess 184 was not formed. As shown in FIG. 10A, the protruding portion 186 was not formed. The evaluation result of the peeling test for the reference electrode 102 was D.

Comparative Example 2

In Comparative Example 2, the layout of the sandwiched portion 180 was Type E. That is, as shown in FIG. 8E, the sandwiched portion 180 was not disposed at any of the portions corresponding to the four sides of the reference electrode 102. The ratio (S1/S2) of the first area S1 to the second area S2 was 0. As shown in FIG. 10B, the recess 184 was formed. As shown in FIG. 10B, the protruding portion 186 was formed. The evaluation result of the peeling test for the reference electrode 102 was D.

Comparative Example 3

In Comparative Example 3, the layout of the sandwiched portion 180 was Type A. That is, as shown in FIG. 8A, the sandwiched portion 180 was disposed only at a portion corresponding to one side of the reference electrode 102. The ratio (S1/S2) of the first area S1 to the second area S2 was 0.25. As shown in FIG. 9A, the recess 184 was not formed. As shown in FIG. 9A, the protruding portion 186 was not formed. The evaluation result of the peeling test for the reference electrode 102 was D.

Comparative Example 4

In Comparative Example 4, the layout of the sandwiched portion 180 was Type A. That is, as shown in FIG. 8A, the sandwiched portion 180 was disposed only at a portion corresponding to one side of the reference electrode 102. The ratio (S1/S2) of the first area S1 to the second area S2 was 0.25. As shown in FIG. 9E, the recess 184 was not formed. As shown in FIG. 9E, the protruding portion 186 was formed. The evaluation result of the peeling test for the reference electrode 102 was D.

Comparative Example 5

In Comparative Example 5, the layout of the sandwiched portion 180 was Type A. That is, as shown in FIG. 8A, the sandwiched portion 180 was disposed only at a portion corresponding to one side of the reference electrode 102. The ratio (S1/S2) of the first area S1 to the second area S2 was 0.25. As shown in FIG. 10C, the recess 184 was formed. As shown in FIG. 10C, the protruding portion 186 was formed. The evaluation result of the peeling test for the reference electrode 102 was D.

Comparative Example 6

In Comparative Example 6, the layout of the sandwiched portion 180 was type B. That is, as shown in FIG. 8B, the sandwiched portions 180 were disposed at portions corresponding to two sides of the reference electrode 102 that face each other. The ratio (S1/S2) of the first area S1 to the second area S2 was 0.25. As shown in FIG. 9B, the recess 184 was not formed. As shown in FIG. 9B, the protruding portion 186 was not formed. The evaluation result of the peeling test for the reference electrode 102 was D.

Comparative Example 7

In Comparative Example 7, the layout of the sandwiched portion 180 was type D. That is, as shown in FIG. 8D, the sandwiched portions 180 were disposed at portions corresponding to four sides of the reference electrode 102. The ratio (S1/S2) of the first area S1 to the second area S2 was 0.25. As shown in FIG. 9B, the recess 184 was not formed. As shown in FIG. 9B, the protruding portion 186 was not formed. The evaluation result of the peeling test for the reference electrode 102 was D.

In this way, by setting the ratio of the first area S1 to the second area S2 to 0.3 or more, it is possible to prevent peeling of the reference electrode 102. As described above, the first area S1 is the area of the portion which is sandwiched between the solid electrolyte layer 64 and the solid electrolyte layer 66, of the reference electrode 102. As described above, the second area S2 is the area of the portion which is exposed in the reference gas chamber 182, of the reference electrode 102.

In addition, at least a part of the portion which is exposed in the reference gas chamber 182, of the reference electrode 102 is provided in the recess 184 formed in the solid electrolyte layer 64, whereby it is possible to more reliably prevent peeling of the reference electrode 102.

Further, the protruding portion 186, which is in contact with the side surface of the reference gas chamber 182 and protrudes into the reference gas chamber 182, is formed on the reference electrode 102, whereby it is possible to more reliably prevent peeling of the reference electrode 102.

As described above, according to the present embodiment, it is possible to provide the gas sensor 10 capable of suppressing the peeling of the reference electrode 102.

Although the preferred embodiment of the present invention has been described above, the present invention is not limited to the above-described embodiment, and various modifications can be made thereto without departing from the scope of the present invention.

The embodiment described above can be summarized as follows.

A gas sensor (10) comprises: a laminate (13, 13A) comprising a plurality of layers including at least one layer made of a solid electrolyte; a reference gas chamber (182) which is formed in the laminate and in which a reference gas exists; and a reference electrode (102) partially exposed in the reference gas chamber. A portion which is not exposed in the reference gas chamber, of the reference electrode is sandwiched between, among the plurality of layers, a first layer (64, 208) and a second layer (66, 206) that is adjacent to the first layer. When an area of the portion which is sandwiched between the first layer and the second layer, of the reference electrode is defined as a first area (S1), and an area of a portion which is exposed in the reference gas chamber, of the reference electrode is defined as a second area (S2), a ratio (S1/S2) of the first area to the second area is 0.3 or more. According to such a configuration, since the portion which is sandwiched between the first layer and the second layer, of the reference electrode has a sufficient area, it is possible to prevent peeling of the reference electrode. Therefore, according to such a configuration, it is possible to provide a highly reliable gas sensor.

At least a part of the portion which is exposed in the reference gas chamber, of the reference electrode may be provided in a recess (184) formed in the first layer. According to such a configuration, since the area of contact between the reference electrode and the laminate increases, it is possible to more reliably suppress peeling of the reference electrode.

The reference electrode may include a protruding portion (186) protruding in contact with a side surface of the reference gas chamber. According to such a configuration, since the area of contact between the reference electrode and the laminate increases, it is possible to more reliably suppress peeling of the reference electrode.

The first layer (64) and the second layer (66) may each be made of a solid electrolyte.

The first layer (208) may be made of a solid electrolyte, and the second layer (206) may be made of an insulator.

A planar shape of the reference electrode may be rectangular, and two or more sides of the reference electrode may be sandwiched between the first layer and the second layer. According to such a configuration, since the reference electrode is more reliably fixed, it is possible to more reliably suppress peeling of the reference electrode.

Three or more sides of the reference electrode may be sandwiched between the first layer and the second layer. According to such a configuration, since the reference electrode is more reliably fixed, it is possible to more reliably suppress peeling of the reference electrode.

Four sides of the reference electrode may be sandwiched between the first layer and the second layer. According to such a configuration, since the reference electrode is more reliably fixed, it is possible to more reliably suppress peeling of the reference electrode.

What is claimed is:

1. A gas sensor comprising:
    a laminate comprising a plurality of layers including at least one layer made of a solid electrolyte;
    a reference gas chamber which is formed in the laminate and in which a reference gas exists; and
    a reference electrode partially exposed in the reference gas chamber, wherein
    a portion which is not exposed in the reference gas chamber, of the reference electrode is sandwiched between, among the plurality of layers, a first layer and a second layer that is adjacent to the first layer,
    when an area of the portion which is sandwiched between the first layer and the second layer, of the reference electrode is defined as a first area, and an area of a portion which is exposed in the reference gas chamber, of the reference electrode is defined as a second area, a ratio of the first area to the second area is 0.3 or more,
    at least a part of the portion of the reference electrode which is exposed in the reference gas chamber is provided in a recess formed in the first layer, and
    the reference electrode includes a protruding portion partially protruding in contact with a side surface of the reference gas chamber.

2. The gas sensor according to claim 1, wherein the first layer and the second layer are each made of a solid electrolyte.

3. The gas sensor according to claim 1, wherein the first layer is made of a solid electrolyte, and the second layer is made of an insulator.

4. The gas sensor according to claim 1, wherein a planar shape of the reference electrode is rectangular, and two or more sides of the reference electrode are sandwiched between the first layer and the second layer.

5. The gas sensor according to claim 4, wherein three or more sides of the reference electrode are sandwiched between the first layer and the second layer.

6. The gas sensor according to claim 5, wherein four sides of the reference electrode are sandwiched between the first layer and the second layer.

* * * * *